United States Patent
Kataoka et al.

[11] Patent Number: 5,943,087
[45] Date of Patent: Aug. 24, 1999

[54] LASER BEAM PRINTING MACHINE

[75] Inventors: Emika Kataoka; Noboru Takizawa, both of Uyko-ku, Japan

[73] Assignee: Rohm Co., Ltd., Kyoto, Japan

[21] Appl. No.: 08/711,148

[22] Filed: Sep. 10, 1996

[30] Foreign Application Priority Data

Sep. 13, 1995 [JP] Japan ................................. 7-260696

[51] Int. Cl.⁶ ........................................... B41J 2/47
[52] U.S. Cl. ...................... 347/250; 347/235; 347/132; 347/261
[58] Field of Search .................................. 347/237, 247, 347/249, 250, 261, 132, 235; 329/325, 360

[56] References Cited

U.S. PATENT DOCUMENTS

| 4,613,877 | 9/1986 | Spencer et al. | 347/133 |
| 4,862,289 | 8/1989 | Shimada | 347/259 |
| 4,975,626 | 12/1990 | Yagi et al. | 347/250 |
| 5,541,637 | 7/1996 | Ohashi et al. | 347/248 |

FOREIGN PATENT DOCUMENTS 7-181409   7/1995   Japan .

*Primary Examiner*—N. Le
*Assistant Examiner*—Hai C. Pham
*Attorney, Agent, or Firm*—Fay, Sharpe, Beall Fagan, Minnich & McKee

[57] ABSTRACT

A laser beam printing machine according to the present invention includes a polygon mirror motor; a first control circuit which generates, in response to an error in rotation of the polygon mirror motor, a control signal which bring about the rotation of the polygon mirror motor to a target rpm and performs a PWM control; an output circuit which receives data for printing and, in response to the received data, outputs data for controlling a laser beam; a voltage controlled oscillator which generates clock pulses for determining the transmission timing of the data from the output circuit; and a second control circuit which controls, in response to the control signal, a control voltage of the voltage controlled oscillator to follow up the rotation fluctuation of the polygon mirror motor.

9 Claims, 5 Drawing Sheets

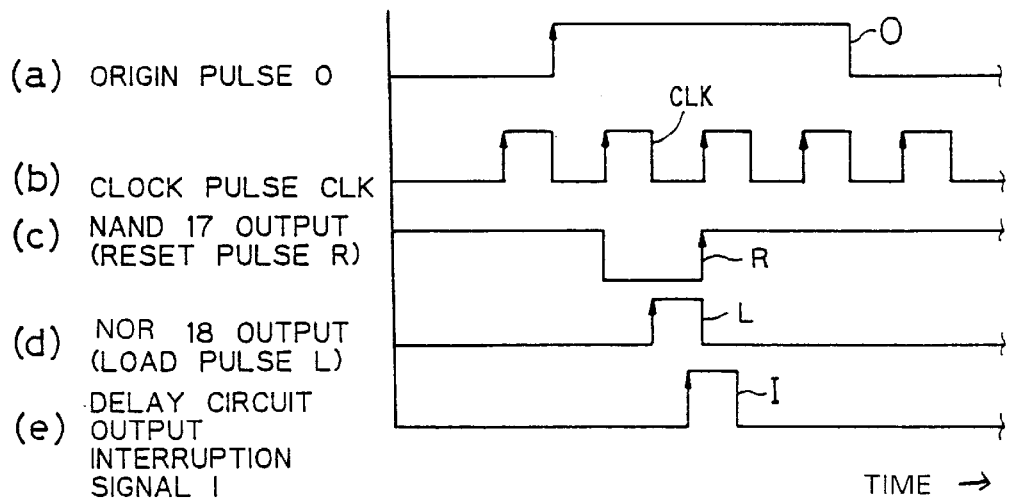
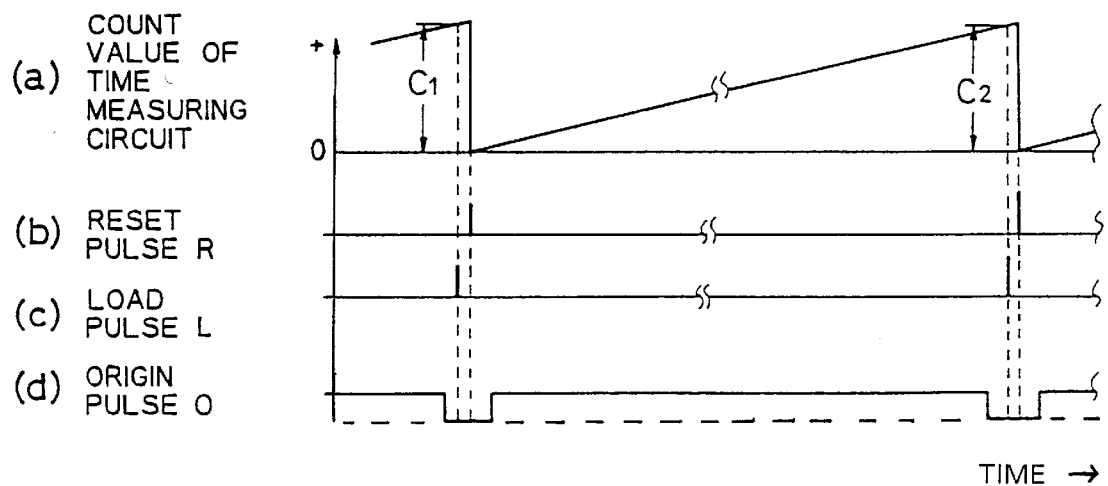

LASER BEAM PRINTING MACHINE

BACKGROUND OF THE INVENTION

1. Field of the Invention

The present invention relates to a laser beam printing machine and, more specifically, relates to a laser beam scanning and plotting type printing machine such as laser beam printers (LBP), plain paper copiers (PPC) and laser facsimile machines, in which a deviation in timing between a beam scanning system and a printing data outputting system is reduced.

2. Description of Related Art

A block diagram of a major portion of a conventional laser beam printer is shown in FIG. 6. In the laser beam printer, a laser beam outputted from a laser beam emitting unit 1 is received on a rotatable polygon mirror 4 from which the laser beam is reflected toward a rotatable photo sensitive drum 5. Thereby, the surface of a photo sensitive medium on the photo sensitive drum 5 is scanned by the laser beam. The laser beam intensity at respective moments is varied through control of the transmittancy or ON/OFF of a liquid crystal shutter 3 in response to image information from an image processing circuit 2. As a result, the charged condition at the surface of the photo sensitive medium on the photo sensitive drum 5 is varied, and toners are adhered thereon according to the varied condition in which they are transferred on a printing paper in a density difference to complete a print image.

M represents a motor in which an FG sensor 8 (a sensor which generates a frequency signal corresponding to motor rotation) is built in, and the signal from the FG sensor 8 is to be received by a mirror rotation control circuit 7 to control the rotation of the motor M. Further, numeral 9 denotes a drum rotation control circuit which controls the rotation of the photo sensitive drum 5.

Further, for the sake of convenience of explanation FIG. 6 is illustrated in a block diagram form wherein the circuits are divided depending on their respective functions, however in an actual control unit, the image processing circuit 2, the drum rotation control circuit 9, and the mirror rotation control circuit 7 are already integrated into one microcomputer and are realized by many kinds of program controls. In the drawing, a focusing lens system which focuses the laser beam on the photo sensitive drum 5 is omitted.

The polygon mirror motor is a special motor in which a sensor used for controlling the rotating speed and phase is provided and a mirror is secured thereto, and therefore is a comparatively expensive part. In particular, in this type of motor it is necessary that the respective reflection faces of the polygon mirror (in the present invention the length of the respective reflection faces is important, therefore hereinbelow the reflection faces are referred to as sides depending on necessity), namely the length of the respective sides of the polygon mirror, are equal such that a high processing accuracy thereof is required. This is because, in order to bring about the rotation of the polygon mirror motor into a constant target value, a difference between the target value and values obtained by actual rotation of the respective sides is calculated as an error and the polygon mirror motor is controlled depending on the calculated error.

In this connection, the present assignee has already filed U.S. patent application Ser. No. 08/337,362, now a U.S. Pat. No. 5,754,215, relating to a printing machine using an inexpensive polygon mirror motor in which respective target values are set depending on the lengths of respective sides of the mirror, errors with respect to respective target values are calculated and the rotation of the polygon mirror motor is controlled according to the calculated errors. The corresponding Japanese Patent Application to the above U.S. Patent Application has been already laid-opened on Jul. 21, 1995 as JP-A-7-181409.

Now, when the rotating condition of the polygon mirror 4 reaches to a steady condition, the laser beam printing machine moves into a printing enable condition at this moment, and print data from a host computer (not shown) are transmitted to the image processing circuit 2 provided as an output circuit of printing data. The image processing circuit 2 adds, for example, already stored printing frame data to the transmitted print data and produces data of image information composed of dot patterns of an amount corresponding to one page. Then, these data are stored in a frame memory 2a provided therein and the data corresponding to the first line among the stored data are parallel-loaded into a shift register 2b, where an origin pulse O from an origin sensor is awaited. When a detected origin pulse O is received from the origin sensor 6, a voltage controlled oscillator (VCO) 2d in a PLL circuit 2c is activated. Output pulses from the VCO 2d are applied to the shift register 2b as clock pulses. The shift register 2b serially outputs printing data in response to the received clock pulses. Namely, the image processing circuit 2 sends out, in response to the origin pulse O, image information which is to be outputted in optical form onto the photo sensitive medium on the photo sensitive drum 5.

In response to the clock pulses from the VCO 2d which is controlled by the PLL control loop in the manner explained above, a predetermined number of bit data are outputted from the shift register 2b at a predetermined timing. In response to the output the liquid crystal shutter 3 is driven and the intensity of the laser beam is controlled.

Herein, the oscillation frequency of the PLL circuit 2c is determined in response to the number of print data in one line and is independent from the rotating condition of the motor system. For this reason, with respect to data remote from one near the origin, in particular, the data sent out last, a timing error of about 0.5 clock pulse is caused. Further, when the accuracy of rotation control for the motor is reduced or the rotation thereof is fluctuated, a shear in dot printing position is likely generated. Such possible shear in printing poses a problem, in particular, when the dot density per inch is enhanced for the printing.

SUMMARY OF THE INVENTION

An object of the present invention is to resolve such problems contained in the conventional art and to provide a laser beam printing machine which reduces shear in dot printing position even if the rotation of the motor is fluctuated some.

A laser beam printing machine according to the present invention which achieves the above object, is characterized in that, the laser beam printing machine comprises: a polygon mirror motor; a first control circuit which generates, in response to an error in rotation of the polygon mirror motor, a control signal which brings about the rotation of the polygon mirror motor to a target rpm and performs a PWM control; an output circuit which receives data for printing and, in response to the received data, outputs data for controlling a laser beam; a voltage controlled oscillator which generates clock pulses for determining the transmission timing of the data from the output circuit; and a second control circuit which controls, in response to the control signal, a control voltage of the voltage controlled oscillator to follow up the rotation fluctuation of the polygon mirror motor.

In particular, the present invention is suitable for controlling laser beam printing machines such as disclosed in the above-mentioned U.S. patent application Ser. No. 08/337, 362, now a U.S. Pat. No. 5,754,215, in which an inexpensive polygon mirror motor is used. As one of specific embodiments according to the present invention, in a laser beam printing machine including a detector which receives a laser beam from a reflection face of a polygon mirror mounted on a polygon mirror motor and detects either a scan initiating position of a scan object or a predetermined position of the reflection face of the rotating polygon mirror; a counter which receives clock pulses serving as a reference for a PWM control and counts the same; a register which stores the count value from the counter when the signal from the detector is received; a memory which stores data with regard to time period when reflecting laser beams from the respective reflection faces of the polygon mirror are directed toward the side of the scan object when the polygon mirror motor is under a predetermined rotating condition while correlating with the respective reflection faces into respective predetermined addresses; and a control circuit which reads out from the memory the data on the reflection face corresponding to the count value stored in the register, produces a PWM signal using a difference between the read-out data and the value stored in the register as an error and drives the polygon mirror motor in response to the produced PWM signal; the above control circuit is replaced by the above indicated first control circuit, and the above indicated output circuit, the voltage controlled oscillator and the second control circuit are further additionally included.

Therefore, through the provision of the second control circuit which controls the control voltage of the VCO, and in response to the PWM signals for performing a PWM control for the rotation of the polygon mirror motor, the second control circuit controls the control voltage of the VCO to follow up the rotation fluctuation, and thereby, the clock pulses for determining the data transmission timing for the printing data outputting system operate as clock pulses which vary in response to the rotation fluctuation of the polygon mirror motor.

As a result, a timing deviation between the motor rotation system and the printing data outputting system is restricted and an error in printing position is reduced for printing data in the last position which are in a remote position from the origin where the printing is initiated. Moreover, since the PWM control signals can be used as they are, the correction thereof is simplified.

Further, because of the advantage of restricting the timing deviation between the motor rotation system and the printing data outputting system, when the second control circuit is incorporated in the laser beam printing machines such as disclosed in above mentioned U.S. patent application Ser. No. 08/337,362, a positional shear in dot printing position is reduced even if a polygon mirror motor of comparatively low accuracy is used.

BRIEF DESCRIPTION OF THE DRAWINGS

FIG. 3 is a timing diagram for explaining the operation of the load timing signal generation circuit as shown in FIG. 2;

FIG. 4 is a timing diagram for explaining a time measurement operation in the motor control circuit as shown in FIG. 1;

DESCRIPTION OF THE PREFERRED EMBODIMENT

Figure 1:
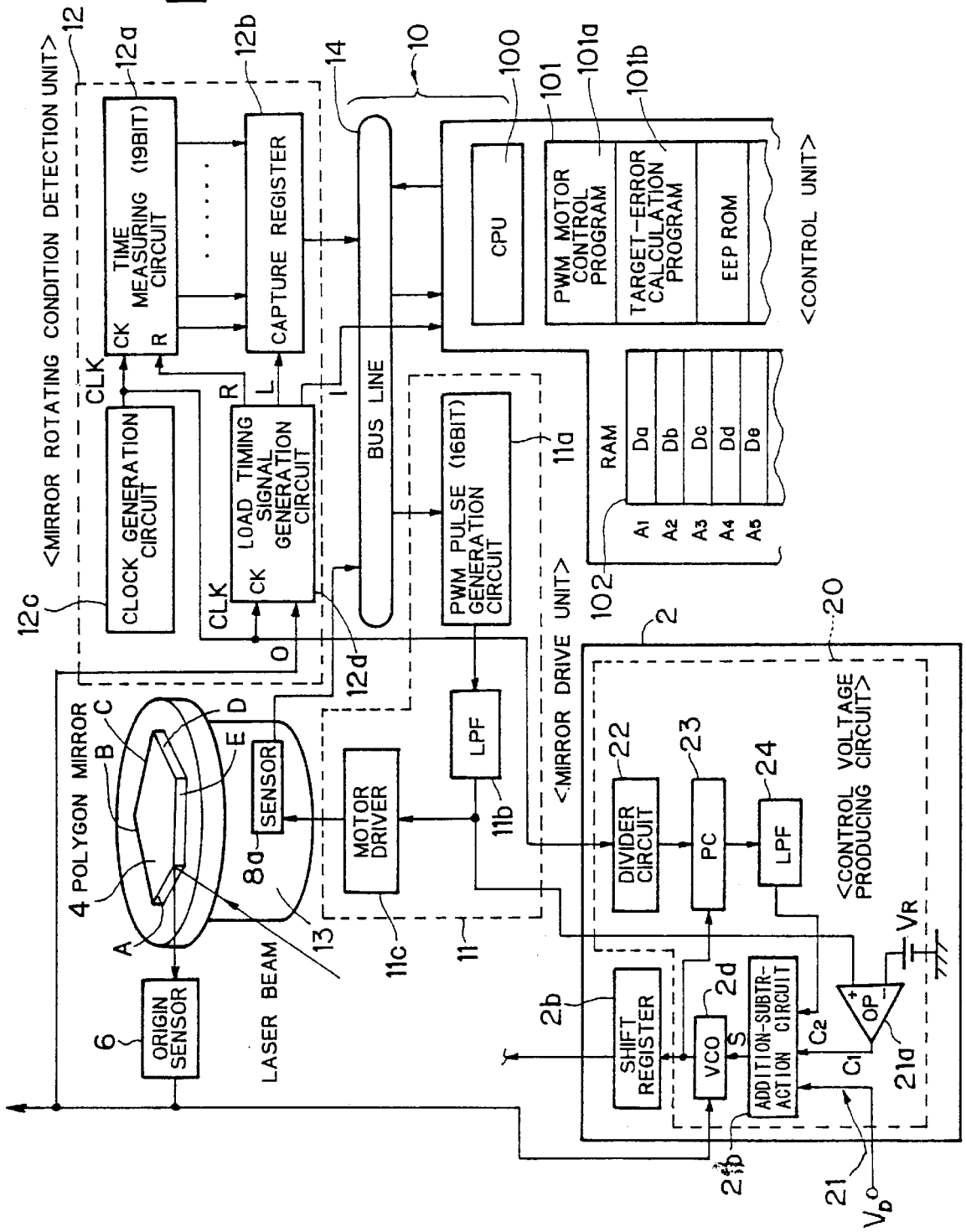
FIG. 1 is a block diagram including primarily a motor control unit in one embodiment of laser beam printers, to which laser beam printing machines according to the present invention are applied.

In FIG. 1, numeral 10 represents a control unit, which is composed of a bus line 14, CPU 100, EEPROM 101, RAM 102 and the like, and a memory in a form of the EEPROM 101 contains a PWM motor control program 101$a$ and a target-error calculation program 101$b$ for control programs. Further, in respective addresses A1, A2, A3, A4 and A5 in the RAM 102, data Da, Db, Dc, Dd and De, which represent time when respective reflection laser beams from respective sides A, B, C, D and E of the polygon mirror 4 (wherein the polygon mirror is assumed as a pentagonal mirror) are directed toward the photo sensitive drum 5, in other words, moving time of the laser beam passing through the photo sensitive drum 5 side under the proper standard rotating condition of the polygon mirror motor 13, are sucessively stored in the order of passing moment through the respective sides during rotation. Further, these data are transferred from the EEPROM 101 to the respective addresses A1, A2, A3, A4 and A5 in the RAM 102 at the initial setting after the power source is switched on. Alternatively a ROM can be used for the EEPROM 101.

These data Da, Db, Dc, Dd and De are determined by measuring time spans between the moment when the respective reflection laser beams from respective sides A, B, C, D and E of the polygon mirror 4 irradiate the origin sensor 6 and another moment when the reflection beam of the following side thereto subsequently irradiates the origin sensor 6 under such rotating condition (the proper standard rotating condition) that the scanning speed on the surface of the photo sensitive drum 5 through respective sides A, B, C, D and E reaches up to a predetermined constant value. The time span can be measured via a measuring device while rotating the respective polygon mirror motors 13 and simulating scanning conditions, or alternatively can be measured after assembling entire elements and when the rotating condition of the particular polygon mirror motor reaches to the standard condition. These measurement data are afterward stored in the EEROM 101 and then transferred to the respective addresses A1 A2, A3, A4 and A5 in the RAM 102.

When the target-error calculation program 101$b$ is executed by the CPU 100, the respective addresses A1, A2, A3, A4 and A5 are accessed in circulation for the corresponding sides A, B, C, D and E which receive laser beams in response to rotation of the polygon mirror 4. Namely, through the execution of the program, in response to rotation of the respective sides and at the position of the origin where the scanning of the subsequent side is initiated the data corresponding to the immediately previous side among the data Da, Db, Dc, Dd and De is referenced, and a difference between the referenced data and the value in the capture register 12$b$ is calculated. This program is a simple one which primarily performs the mere reference to data and calculation of difference such that explanation of the content is omitted. Further, the target-error calculation program 101$b$ causes the CPU 100 to execute the PWM motor control program 101$a$ after storing the calculated error in the RAM 102.

PWM motor control program 101a is one in which the above calculated error value is substituted into a predetermined function and a data with regard to pulse width which nulls the error is calculated. For example, a pulse data which eliminates error is produced and outputted which is determined by subtracting from the data having a reference pulse width of the above error component or of a value determined by multiplying a predetermined coefficient by the error component. Further, this type of program is already known in PWM control technology.

Figure 6:
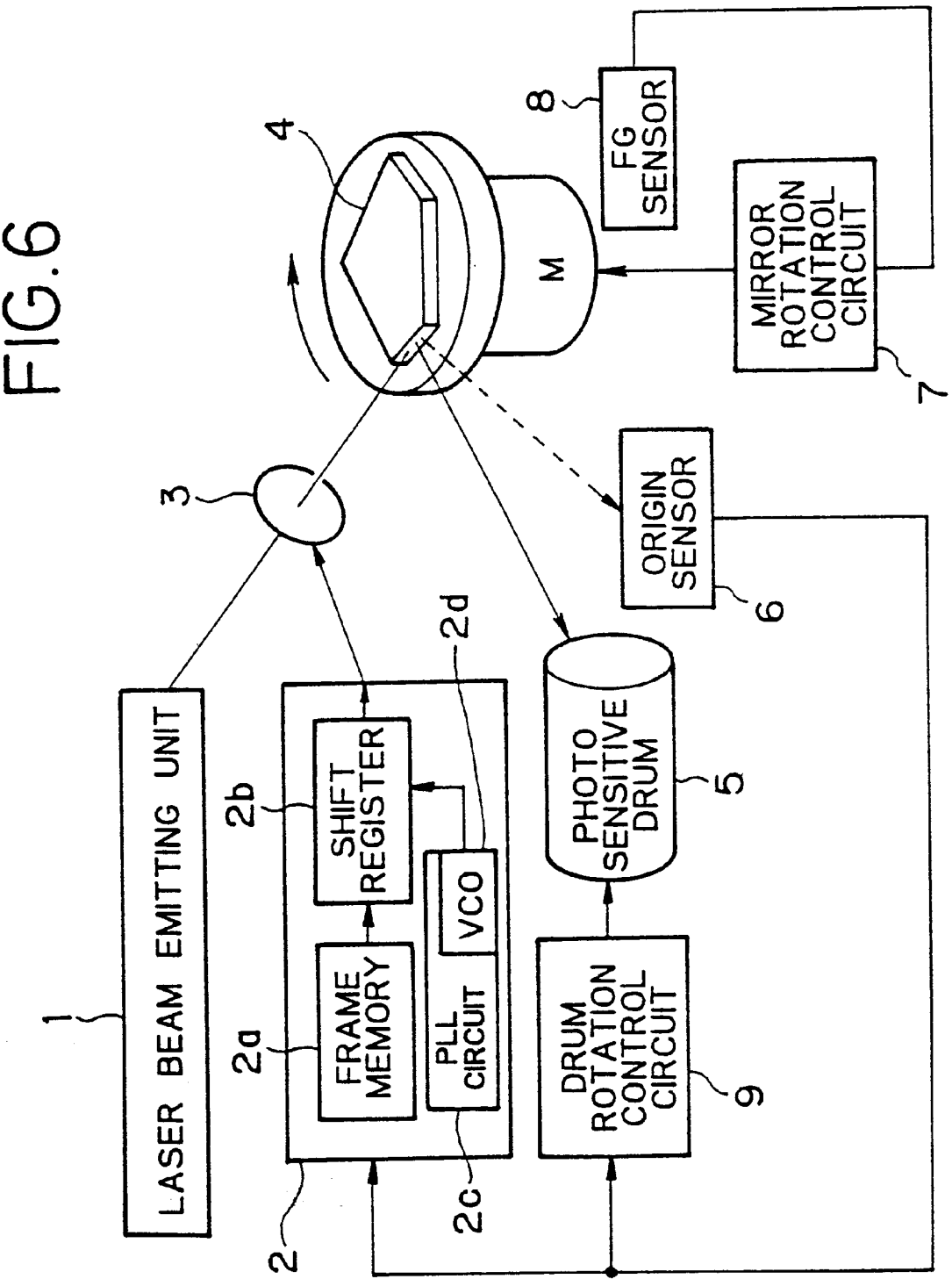
FIG. 6 is a block diagram of a major portion of a conventional laser beam printer.

In FIG. 1, the same constitutional elements as in FIG. 6 are denoted by the same reference numerals, therefore, the explanation thereof is omitted. In the present embodiment, the portion corresponding to the mirror rotation control circuit 7 in FIG. 6 is constituted by a mirror driving unit 11 and a mirror rotating condition detection unit 12 as well as the control unit 10. Further, in place of the FG sensor 8 illustrated in FIG. 6, a sensor 8a which is designed to detect arrival of a predetermined side via rotation is provided. In the present embodiment the sensor 8a is a sensor for detecting the side A which detects arrival of the side A to a predetermined position. The detection signal is sent to the CPU 100 via the bus line 14 as an interruption signal.

When the CPU 100 receives the detection signal from the sensor 8a, the CPU 100 sets a value of an address counter (not shown) representing an address for accessing to the RAM 102 at A1 corresponding to the side A.

The mirror driving unit 11 is constituted by a PWM pulse generation circuit 11a, a low pass filter (LPF) 11b and a motor driver 11c, and the PWM pulse generation circuit 11a is connected to the control unit 10 via the bus line 14. Herein, "PWM" implies the so called pulse width modulation and the PWM pulse generation circuit 11a is a circuit in which bit data is converted into a pulse width and a pulse having the pulse width corresponding to the data value is generated.

In the present embodiment, a part of the output of the LPF 11b is transmitted to a PLL circuit 20 in an image processing circuit 2. The PLL circuit 20 is similar to the PLL circuit 2c in FIG. 6, but differs in particular, on a point that a control voltage producing circuit 21 is provided which generates a voltage for the VCO 2d within the PLL loop so as to follow up the fluctuation in the motor rotation system. Namely, the PLL circuit 20 is constituted by a divider circuit 22 which receives clock pulses CLK from the VCO 2d and the clock generation circuit 12c, a phase comparing circuit (PC) 23 which receives outputs from the VCO 2d and the divider circuit 22 and compares the phases of these outputs, a low pass filter (LPF) 24 which extracts low frequency components from the output of the PC 23 and smooths the control voltage, and the control voltage producing circuit 21 which receives the outputs of the LPF 24, and the LPF 11b and control voltage $V_D$, and generates the control voltage for the VCO 2d.

The divider circuit 22 reduces the frequency of the clock pulses CLK from the clock generation circuit 12c until the same matches with the oscillation frequency of the VCO 2d.

The control voltage producing circuit 21 includes an operational amplifier 21a and an addition-subtraction circuit 21b. The operational amplifier 21a calculates a difference between the output of the LPF 11b and a predetermined reference voltage value VR and generates a voltage value Cl which is determined by multiplying the difference by a predetermined rate. The addition-subtraction circuit 21b receives the voltage value Cl, subtracts the same from the output voltage value C2 of the LPF 24 and transmits the resultant voltage value S=C2−Cl+$V_D$ to the VCO 2d as the control voltage. The voltage value $V_D$ is a control voltage in response to the number of print data in one line in the image processing circuit. The adding and subtracting operations herein include the positive and negative polarities, therefore, when Cl is negative, the operation actually corresponds to addition.

The predetermined reference voltage value VR applied to the operational amplifier 21a corresponds to a voltage value which is generated by the LPF 11b depending on the pulse width of a received pulse (PWM signal) for the PWM control which is generated when the rotation of the polygon mirror 4, in other words the polygon mirror motor 13, is in a normal rotating condition. At this time, the pulse width becomes a reference pulse width.

Now, the operation of the PLL circuit 20 is explained. When the rotation of the polygon mirror 4 is higher than that in a normal rotating condition (reference rotation), data having a narrower pulse width than that of the reference pulse width are set in the PWM pulse generation circuit 11a in order to reduce the rotating speed, and thereby, the voltage of the LPF 11b is reduced lower than the reference voltage VR. As a result, the difference with the reference voltage value VR changes to negative, and the control voltage producing circuit 21 generates a control voltage which matches to the current rotation condition of the motor (which is higher than the normal rotation condition) by adding the value determined by the difference multiplied with the predetermined rate component (the predetermined rate component is determined by the amplification rate of the operational amplifier 21a) to the sum of the control voltage value $V_D$ and the output voltage value of the LPF 24. The generated voltage is applied to the VCO 2d as the control voltage, and the VCO 2d is shifted to a higher frequency side and outputs clock pulses having a higher frequency than a predetermined frequency, which permits to follow up the rotation of the polygon mirror motor 13.

On the contrary, when the rotation of the polygon mirror 4 is lower than the normal rotating condition, data having a broader pulse width than the reference pulse width are set at the PWM pulse generation circuit 11a in order to increase the rotating speed; thereby, the voltage of the LPF 11b rises higher than the reference voltage value VR. As a result, the difference with the reference voltage value VR changes to positive and the control voltage producing circuit 21 generates a control voltage which matches to the current lower rotation condition of the motor by subtracting the difference multiplied by the predetermined rate component from the sum of the voltage value $V_D$ and the output voltage value of the LPF 24. Thereby, clock pulses having a lower frequency than a predetermined frequency are outputted from the VCO 2d.

When the rotation of the polygon mirror 4 is in a normal rotation condition (reference rotation), the above difference value with the reference voltage value VR assumes "0", and the sum of the voltage value $V_D$ and the output voltage value of the LPF 24 is generated from the control voltage producing circuit 21 and is applied as it is to the VCO 2d. As a result, the VCO 2d is PLL-controlled at an oscillation frequency in response to the control voltage $V_D$ and under a steady state corresponding to a normal rotation condition.

In the present embodiment, VCO 2d is activated by the origin pulse O and in synchronism thereto oscillating signals are outputted.

The mirror rotating condition detection unit 12 is constituted by a time measuring circuit 12a, the capture register 12b, a clock generation circuit 12c and a load timing signal generation circuit 12d, and the capture register 12b is connected to the control unit 10 via the bus line 14.

The time measuring circuit 12a is a free running counter of 19 bits which receives clock pulses CLK from the clock generation circuit 12c, and the count value thereof represents a time value from a count initiation moment. Further, circuits other than the LPF 11, the time measuring circuit 12a and the clock generation circuit 12c are constituted as internal circuits of a microcomputer and the above excluded circuits are provided as externally added parts for the microcomputer.

Polygon mirror motor 13 incorperates the sensor 8a therein, and is driven by the motor driver 11c in the mirror driving unit 11 and rotates the polygon mirror 4. The load timing signal generation circuit 12d receives clock pulses CLK, for example, of a frequency of 50 MHz from the clock generation circuit 12c, and further generates a reset pulse R, a load pulse L and an interruption signal I when an origin pulse O is received from the origin sensor 6. The reset pulse R resets the count value of the time measuring circuit 12a, the load pulse L is added to the capture register 12b whereby the capture register 12b captures the count value of the time measuring circuit 12a, and the interruption signal I constitutes an interruption signal to the CPU 100 in the control unit 10. In response to the interruption the CPU 100 executes the target-error calculation program 101b.

Figure 2:
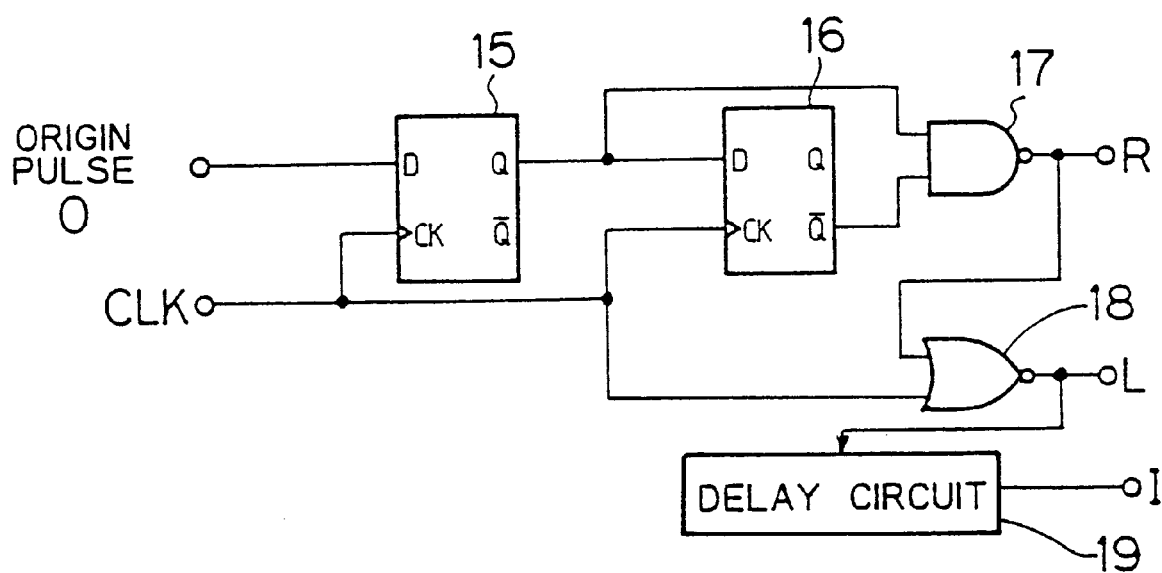
FIG. 2 is a block diagram of a load timing signal generation circuit in the motor control circuit as shown in FIG. 1.

The load timing signal generation circuit 12d generates pulses of the load pulse L and reset pulse R in this order in response to generation of one origin pulse O. FIG. 2 is a detailed circuit diagram of the load timing signal generation circuit 12d which is constituted by two D latch flip-flop circuits 15 and 16, two NAND gates 17 and NOR gate 18 and a delay circuit 19.

The operation thereof is explained with reference to FIG. 3. When an origin pulse O is generated ((a) in FIG. 3), the origin pulse O is inputted to the data input of the D latch flip-flop circuit 15, and the input is held at the timing of the leading edge of a clock pulse CLK ((b) in FIG. 3) to generate an output (HIGH level) at Q. The Q output is applied to the data input of the flip-flop circuit 16 in the subsequent stage as well as applied to the NAND gate 17. Thereby, the NAND gate 17 is rendered to LOW level ((c) in FIG. 3). When the subsequent clock pulse CLK is applied to the flip-flop circuit 16 in the subsequent stage, at the timing of the leading edge of the clock pulse the data is set in the flip-flop circuit 16, and the output at Q is dropped (is rendered to LOW level).

Since the $\overline{Q}$ output of the flip-flop circuit 16 is applied to the NAND gate 17, as a result, a reset pulse having a waveform indicated by R ((c) in FIG. 3) is generated at the NAND gate 17. The time measuring circuit 12a is reset at the timing of the leading edge of the reset pulse R. On one hand, the NOR gate 18 generates a load pulse L ((d) in FIG. 3) when a reset pulse R (LOW level) and the trailing edge of a clock pulse CLK are received. The capture register 12b fetches the count value of the time measuring circuit 12a at the timing of the leading edge of the load pulse L. Further, the interruption signal I is generated from the delay circuit 19 at a timing slightly delayed from the load pulse L ((e) in FIG. 3), and is sent out to the CPU 100 in the control unit 10. Namely, in the present load timing signal generation circuit 12d, the load pulse L is generated prior to the reset signal R so that the capture register 12b captures the count value of the time measuring circuit 12a, and thereafter the value of the time measuring circuit 12a is reset by the trailing edge of the reset signal at the timing of the subsequent clock pulse.

Now, the general control operation of the present embodiment is explained. When the load timing signal generation circuit 12d receives an origin pulse O from the origin sensor 6, the load timing signal generation circuit 12d generates at first the load pulse L at the timing as explained in connection with FIG. 3 and thereafter generates the reset pulse R, which is repeated every time an origin pulse O is inputted. The load pulse L and reset pulse R are generated alternatively in this order. Although the control is started by an interruption signal I generated in response to a load pulse L generated at the very first time, when neglecting this very first load pulse L, it will be assumed that after a reset pulse R which is generated by a certain origin pulse O, a load pulse L is generated in response to a subsequent origin pulse O as illustrated in FIG. 4((b) and (c) in FIG. 4). The value of the time measuring circuit 12a is rendered "O" by the preceeding reset pulse R and the time measuring circuit 12a starts a time measuring operation according to a clock pulse CLK. Then, in response to generation of the subsequent origin pulse O ((d) in FIG. 4), the measured time value of the time measuring circuit 12a is fetched by the capture register 12b which has received a load pulse L from the load timing signal generation circuit 12d. The measured time value represents a count value (Cl in (a) in FIG. 4) at the moment, namely, a passing time of the laser beam reflected by a certain side passing over the side of the photo sensitive drum 5. After the generation of the load pulse L, the value of the time measuring circuit 12a is reset by the reset pulse R generated in response to the above mentioned origin pulse O, and the time measuring circuit 12a restarts counting operation of clock pulses CLK (C1, C2 in (a) in FIG. 4).

Figure 5:
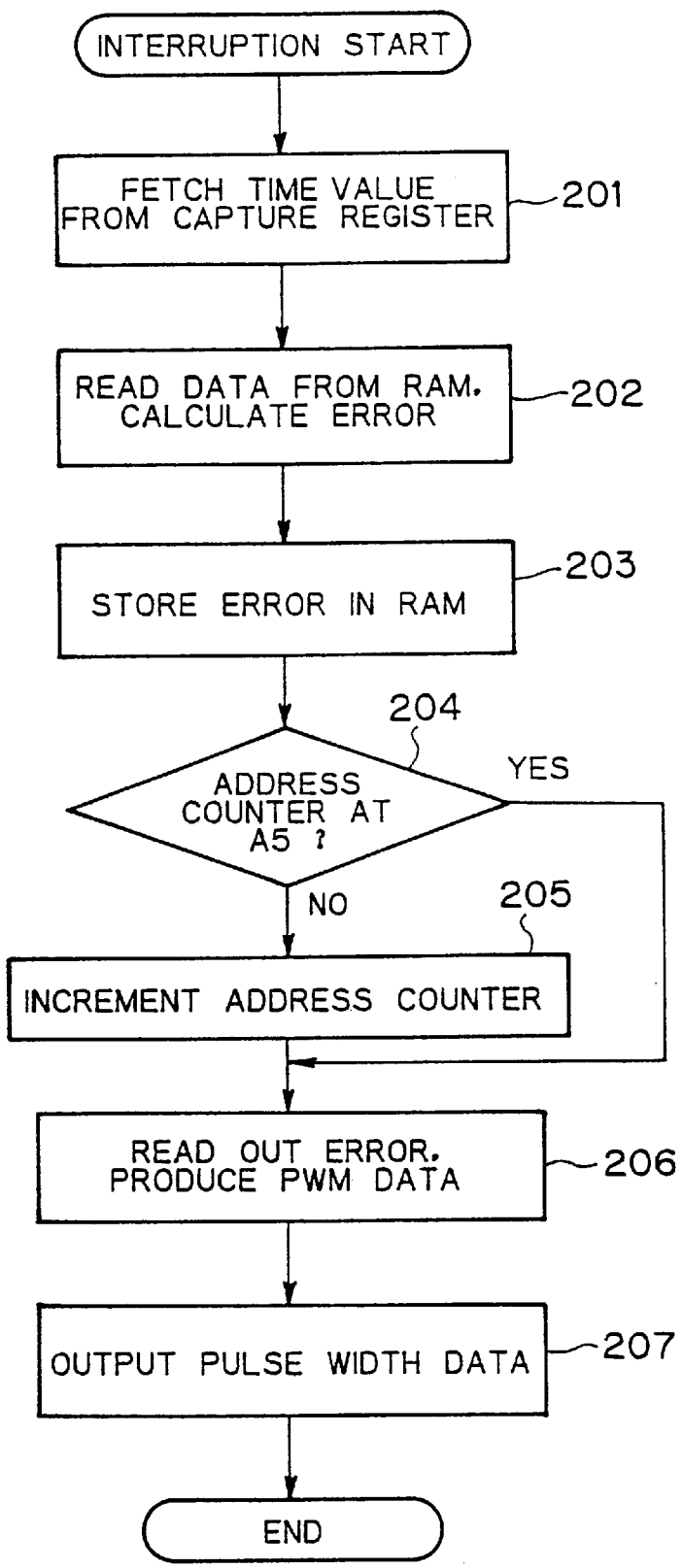
FIG. 5 is a flow chart of a general processing of a PWM control in the control unit as shown in FIG. 1.

Now, the PWM control in the control unit 10 is explained with reference to the flowchart as illustrated in FIG. 5. For example, in response to an origin pulse O which is generated after passing the side A of the polygon mirror 4 and starting the scanning operation by the side B, an interruption signal I is generated following a load pulse L. At this moment, through another interruption processing program, the CPU 100 has received a detection signal from the sensor 8a indicating the passing of the side A, and in response to the detection signal sets an address counter for accessing the RAM 102 in the address A1 corresponding to the side A. Further, the capture register 12b fetches the time value (C1, C2, ... in (a) in FIG. 4) from the time measuring circuit 12a in response to generation of the load pulse L.

On one hand, in response to the generation of the interruption signal I, the CPU 100 at first executes the target-error calculation program 101b wherein the above mentioned time value from the capture register 12b (step 201) is fetched, data Da among data Da, Db, Dc, Dd and De is fetched by accessing to address A1 in the RAM 102 and an error from the fetched data is calculated (step 202). The calculated error is stored in the RAM 102 (step 203) and it is judged whether the value of the address counter is A5 (step 204). When the judgement is "NO", the address of the program counter (not shown) is incremented to address A2 (step 205). When the judgement is "YES", the process jumps over the step 205 and moves to step 206. Then, PWM motor control program 101a is executed wherein the stored error data is read out from the RAM 102 and a PWM data depending on the error amount is produced which nulls the error (step 206). The produced PWM data is outputted in a form of a predetermined pulse width data to the PWM pulse generation circuit 11a (step 207).

As a result, a data bit representing the pulse width which controls the rotation of the polygon mirror motor 13 in the direction for eliminating the error depending on the amount of error is sent out to the PWM pulse generation circuit 11a. The PWM pulse generation circuit 11a generates a pulse having a pulse width corresponding to the received data bit which is applied to the LPF 11b, wherein the pulse is wave-shaped into a drive wave form and sent out to the motor driver 11c.

At the same moment, a voltage for the VCO 2d is produced by the control voltage producing circuit 21 in the PLL circuit 20 in response to the output voltage of the LPF 11b and the control voltage $V_D$, and the oscillation frequency of the VCO 2d is PLL-controlled. As a result, the frequency of the clock pulses outputted from the VCO 2d is varied and the frequency varied clock pulses are transmitted from the PLL circuit 20 to the shift register 2b in the image processing circuit 2. Accordingly, the data for printing transmitted from the shift register 2b are controlled to relate the clock pulses having a frequency corresponding to the current rotating condition of the polygon mirror motor 13 and are transmitted to the liquid crystal shutter 3. Thereby, the output timing of the printing data varies depending on the current rotating condition of the polygon mirror motor 13 and the positional shear in dot printing position is reduced.

Now, returning to the explanation with reference to FIG. 5, the above operation is performed in response to respective interruption signals I which are successively generated in response to rotation of the respective sides A, B, C, D and E of the polygon mirror 4 and when the value of the program counter reaches A5, the value is subsequently returned to A1 and the addresses A1, A2, A3, A4 and A5 are successively accessed in circulation. Thus, the resultant data Da, Db, Dc, Dd and De are successively generated in circulation after the laser beam reflected by the respective sides A, B, C, D and E has passed over the side of the photo sensitive drum 5 and errors between the generated data and the actual passing times of the sides A, B, C, D and E are calculated for respective sides. Then, PWM data which eliminate the errors are produced depending on the amount of errors via the PWM motor control program 101a every time the respective sides pass, and are outputted to the PWM pulse generation circuit 11a.

Thereby, the rotation of the polygon mirror motor 13 is controlled depending on the deviation amount of the errors so that the rotation coincides with the standard rotation in which the data Da, Db, Dc, Dd and De were measured.

Further, since the rotation is controlled with reference to the origin sensor 6 as explained above, the rotating phase is also matched to the detection timing of the origin sensor 6. Still further, since the origin sensor 6 is located at the reference position for scanning of the photo sensitive drum 5, the scanning phase over the photo sensitive drum 5 is also synchronized thereby.

Now, the general operation of the laser beam printer is explained with reference to FIG. 6 and FIG. 1. When the power source is switched on, for the first time through control of the control unit 10 which detects a low rotating condition of the polygon mirror 4, the rotation of the polygon mirror 4 is accelerated. When the rotating speed of the polygon mirror 4 reaches up to a speed in which the laser beam scans a distance corresponding to one dot in an image, for example, in a time of 100 ns, thereafter the above explained control is performed so as to maintain the rotating speed which meets the proper standard rotation speed according to the data Da, Db, Dc, Dd and De which were stored in the RAM 102.

Through the above operation, when the rotating condition of the polygon mirror 4 reaches to the steady state, the preparation of the optical system is completed and the laser beam printer is placed in the condition allowing printing. When the image processing circuit 2 receives printing data from a host computer (not shown), the image processing circuit 2 adds printing frame data, for example, which are stored in advance to the received printing data to produce image information data for one page composed of a dot pattern, and stores the same in the frame memory 2a. Data for the first line among the stored image information data are parallel-loaded in the shift register 2b to wait for an origin pulse O from the origin sensor 6. When the origin pulse O is received, the image processing circuit 2 outputs the image information data in synchronism with the origin pulse O.

The above output is sent out to the liquid crystal shutter 3 and the transmittancy of the liquid crystal shutter 3 is varied depending on the output, in that the intensity of the laser beam which scans over the photo sensitive drum 5 is varied depending on the dot pattern data of the image information from the image processing circuit 2. Thereby, the plotting for one line is performed over the photo sensitive drum 5. In this way, when one scanning operation by the laser beam is completed, the photo sensitive drum 5 rotates by an amount corresponding to one dot in the vertical direction and the processing is repeated.

In the above explained embodiment, the rotation error corresponding to the lengths of the respective sides are calculated via the target-error calculation program 101b, however, in place of the processing via the program, such processing can be performed by a hardware circuit provided with a subtraction circuit or a comparison circuit, and a program counter which designates a memory and address. Through incrementing the program counter, the value thereof is circulated, and thereby the error calculation is performed at a high speed.

Further, in this embodiment, the data Da, Db, Dc, Dd and De are stored in an order in the respective addresses in association with the rotation; however, it is enough if data corresponding to the respective sides are obtained, and therefore it is not necessarily needed that the data are stored in an order.

We claim:

1. A laser beam printing machine comprising:
   a polygon mirror motor;
   a first control circuit which generates in response to a rotation fluctuation of said polygon mirror motor a first control signal which brings about a rotation of said polygon mirror motor to a target rpm and performs a pulsewidth modulation (PWM) control;
   an output circuit which receives print data for printing and in response to the received data outputs control data for controlling a laser beam;
   a voltage controlled oscillator (VCO) which generates clock pulses for controlling a transmission timing of the data from said output circuit; and,
   a second control circuit which generates in response to the first control signal a VCO control voltage for controlling said voltage controlled oscillator to follow up the rotation fluctuation of said polygon mirror motor.

2. The laser beam printing machine according to claim 1, wherein
   said first control circuit includes a clock generation circuit which generates clock pulses operating as a reference for (PWM) control; and,
   said second control circuit is a (PLL) circuit which includes:

a divider circuit which divides the clock pulses from said clock generation circuit, and generates a divided output signal;

a phase comparing circuit which compares the divided output signal of said divider circuit and the clock pulses from said voltage controlled oscillator and outputs a difference voltage signal depending on a difference in phase between these signals; and, a control voltage producing circuit which produces the VCO control voltage depending on the output of said phase comparing circuit and the first control signal.

3. The laser beam printing machine according to claim 2, further comprising:

a low pass filter which receives the output difference voltage signal of said phase comparing circuit and generates a filtered output voltage; and, wherein said control voltage producing circuit includes:

a reference voltage circuit which generates a reference voltage value representative of a value of the first control signal which is generated when the rotation of said polygon mirror motor is in a normal rotation condition;

a first voltage generating circuit which generates a voltage depending on a difference in voltage between the reference voltage value and the first control signals; and, a second voltage generating circuit which generates the VCO control voltage depending on the output voltage of said first voltage generating circuit and the filtered output voltage of said low pass filter.

4. The laser beam printing machine according to claim 3, wherein said second voltage generating circuit includes an adding and subtracting circuit which subtracts the output voltage value of said first voltage generating circuit from the filtered output voltage value of said low pass filter and adds a control voltage value, in response to the print data in one line, to the filtered output voltage value of said low pass filter.

5. A laser beam printing machine comprising:

a polygon mirror motor;

a polygon mirror having reflecting faces mounted on said motor;

a detector which receives a laser beam from a reflection face of said polygon mirror, detects either a scan initiating position of a scan object or a predetermined position of a reflection face of the rotating polygon mirror and generates a detection signal;

a counter which receives clock pulses serving as a reference for a (PWM) control, counts the same and generates a count value;

a register which stores the count value from said counter when the detection signal from said detector is received;

a memory which stores data representative of time periods during which the laser beam is reflected from the respective reflection faces of the polygon mirror toward a scan object when said polygon mirror motor is under a predetermined rotating condition, and said data is correlated with respective reflection faces and stored in respective predetermined addresses;

a first control circuit which reads out from said memory the data corresponding to a reflection face, produces a PWM signal using a difference between the read-out data and the count value stored in said register as an error and produces a first control signal which drives said polygon mirror motor in response to the produced PWM signal;

an output circuit which receives print data for printing and in response to the received data outputs control data for controlling a print laser beam;

a voltage controlled oscillator (VCO) which generates clock pulses for controlling a transmission timing of the control data from said output circuit; and, a second control circuit which generates in response to the first control signal a VCO control voltage for controlling said voltage controlled oscillator in response to the rotation fluctuation of said polygon mirror motor.

6. The laser beam printing machine according to claim 5, wherein said first control circuit includes a clock generation circuit which generates clock pulses operating as a reference for PWM control; and, said second control circuit is a (PLL) circuit which includes:

a divider circuit which divides the clock pulses from said clock generation circuit and generates a divided output signal;

a phase comparing circuit which compares the divided output signal of said divider circuit and the clock pulses from said voltage controlled oscillator and outputs a difference voltage signal depending on a difference in phase between these signals; and, a control voltage producing circuit which produces the VCO control voltage depending on the output of said phase comparing circuit and the first control signal.

7. The laser beam printing machine according to claim 6, further comprising:

a low pass filter which receives the output difference voltage signal of said phase comparing circuit, and generates a filtered output voltage, and wherein said control voltage producing circuit includes:

a reference voltage circuit which generates a reference voltage value representative of a value of the first control signal which is generated when the rotation of said polygon mirror motor is in a normal rotation condition;

a first voltage generating circuit which generates a voltage depending on a difference between the reference voltage value and the first control signal, and, a second voltage generating circuit which generates the VCO control voltage depending on the output voltage of said first voltage generating circuit and the filtered output voltage of said low pass filter.

8. The laser beam printing machine according to claim 7, wherein said second voltage generating circuit includes a circuit which subtracts the output voltage value of said first voltage generating circuit from the filtered output voltage value of said low pass filter and adds a control voltage value, in response to the print data in one line, to the filtered output voltage value of said low pass filter.

9. The laser beam printing machine according to claim 5, wherein said scan object is a photo sensitive drum, said counter is one which measures respective times when the reflected laser beam from the respective reflection faces of said rotatable polygon mirror is directed toward said photo sensitive drum in response to the clock signals, the predetermined rotating condition represents one in which a scanning speed of the laser beam through the respective reflection faces over said photo sensitive drum substantially reaches to a predetermined constant value, said first control circuit accesses the data in sequence while correlating the respective predetermined addresses in said memory to the respective reflection faces of said rotatable polygon mirror, said polygon mirror motor includes a sensor which detects arrival through rotation of a predetermined reflection face of said rotatable polygon mirror, said memory successively stores the data in the respective addresses in association with an order of passing through rotation of the respective reflection faces, renews the address to the subsequent address every time after the detection signal from said detector is received and changes the address to the address containing the data corresponding to the predetermined reflection face when the detection signal from said sensor is received.

* * * * *